(12) United States Patent
McGarvey et al.

(10) Patent No.: US 6,593,967 B1
(45) Date of Patent: Jul. 15, 2003

(54) ELECTRONIC CAMERA HAVING DUAL CLOCKED LINE MEMORY

(75) Inventors: James E. McGarvey, Hamlin, NY (US); Claude A. LaRoche, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/212,232

(22) Filed: Dec. 16, 1998

(51) Int. Cl.[7] .......................... H04N 3/14; H04N 5/335; H04N 5/228
(52) U.S. Cl. ..................................... 348/312; 348/222.1
(58) Field of Search ......................................... 348/312

(56) References Cited

U.S. PATENT DOCUMENTS

| | | | |
|---|---|---|---|
| 3,971,065 A | 7/1976 | Bayer | 348/276 |
| 5,016,107 A | 5/1991 | Sasson et al. | 348/231.1 |
| 5,396,460 A | 3/1995 | Harada et al. | 365/220 |
| 5,473,574 A | 12/1995 | Clemen et al. | 365/230.05 |
| 5,497,192 A | 3/1996 | Ishizuka | 348/208.13 |
| 5,513,139 A | 4/1996 | Butler | 365/189.04 |
| 5,539,455 A | 7/1996 | Makioka | 348/222.1 |
| 5,559,553 A | 9/1996 | Bitek | 348/312 |
| 5,581,280 A | 12/1996 | Reinert et al. | 345/558 |
| 5,583,567 A | 12/1996 | Nagasawa et al. | 348/222.1 |
| 5,587,953 A | 12/1996 | Chung | 365/220 |
| 5,655,113 A | 8/1997 | Leung et al. | 713/401 |
| 6,144,407 A | * 11/2000 | Mizutani et al. | 348/312 |

OTHER PUBLICATIONS

Personal Computer Memory Card International Association, PC Card Standard Release 2.0, Sunnyvale, California Sep. 1991.

* cited by examiner

Primary Examiner—Ngoc-Yen Vu
Assistant Examiner—Tia M. Harris
(74) Attorney, Agent, or Firm—Pamela R. Crocker

(57) ABSTRACT

An electronic camera for capturing and storing images includes an image capture section and an image processing section. The image capture section includes an image sensor for capturing an image and producing pixel data representative of the captured image, an analog-to-digital (A/D) converter for digitizing the pixel data, and a horizontal shift register responsive to applied vertical clock signals for receiving lines of the pixel data from the image sensor and responsive to applied horizontal clock signals for sequentially transferring the lines of pixel data to the A/D converter, the time between the application of horizontal and vertical clock signals providing for a vertical transfer interval wherein pixel data is prevented from being output from the horizontal shift register. The image processing section includes a first-in-first-out (FIFO) memory coupled to the A/D converter for temporarily storing the digitized pixel data, a digital signal processor coupled to the FIFO memory for processing the digitized pixel data, and a storage device coupled to the digital signal processor for storing the processed digitized pixel data. The electronic camera further includes a clock generator for producing the vertical and horizontal clock signals and a FIFO write signal for causing the digitized pixel data from the A/D converter to be transferred to storage locations in the FIFO memory at a first frequency, and a master pixel clock signal. The camera further includes circuitry for producing a FIFO read signal in response to the master pixel clock signal for transferring the digitized pixel data from the FIFO memory to the digital signal processor at a second frequency for processing the digitized pixel data, and after processing, for transferring the processed pixel data to the storage device. The second frequency is selected to be lower than the first frequency.

3 Claims, 3 Drawing Sheets

ELECTRONIC CAMERA HAVING DUAL CLOCKED LINE MEMORY

FIELD OF THE INVENTION

The present invention relates generally to the field of electronic imaging, and in particular, to an electronic camera having dual clocked line memory.

BACKGROUND OF THE INVENTION

Many video cameras provide real-time digital processing of images from charge-coupled device (CCD) sensors. The signal processing circuits operate at the same clock frequencies as the sensor and are, therefore, unused during the sensor vertical transfer intervals. In a digital still camera, it is desirable to provide as high a frame rate as possible by reading out the image sensor data as quickly as possible, while still minimizing the clock frequency of the real-time digital processing circuitry, to minimize the cost and power consumption.

Commonly-assigned U.S. Pat. No. 5,016,107, entitled "Electronic still camera utilizing image compression and digital storage," teaches an electronic camera that includes multiple image buffers to allow non-real time processing of the images. By storing the images in frame memories, it is possible to process previously captured images during the vertical transfer intervals associated with the readout of newly captured images. However, this design requires multiple, expensive frame memories and does not allow real-time processing of an image during the vertical transfer interval of that same image.

SUMMARY OF THE INVENTION

Accordingly, it is an object of the present invention to provide a digital image camera with increased throughput from the image sensor to image processing to final storage.

This object is achieved by an electronic camera for capturing and storing images, comprising:

(a) an image capture section including:
   (i) an image sensor for capturing an image and producing pixel data representative of the captured image;
   (ii) an analog-to-digital (A/D) converter for digitizing the pixel data; and
   (iii) a horizontal shift register responsive to applied vertical clock signals for receiving lines of the pixel data from the image sensor and responsive to applied horizontal clock signals for sequentially transferring the lines of pixel data to the A/D converter, the time between the application of horizontal and vertical clock signals providing a vertical transfer interval wherein pixel data is prevented from being output from the horizontal shift register; and (b) an image processing section including:
   (i) a first-in-first-out (FIFO) memory coupled to the A/D converter for temporarily storing the digitized pixel data;
   (ii) a digital signal processor coupled to the FIFO memory for processing the digitized pixel data; and
   (iii) storage means coupled to the digital signal processor for storing the processed digitized pixel data;

(c) clock generator means for producing the vertical and horizontal clock signals and a FIFO write signal for causing the digitized pixel data from the A/D converter to be transferred to storage locations in the FIFO memory at a first frequency, and a master pixel clock signal;

(d) means responsive to the master pixel clock signal for producing a FIFO read signal for transferring the digitized pixel data from the FIFO memory to the digital signal processor at a second frequency for processing the digitized pixel data, and after processing, for transferring the processed pixel data to the storage means; and (e) wherein the second frequency is selected to be lower than the first frequency.

ADVANTAGES

An advantage of the present invention is to provide an effective way for an electronic camera to increase the throughput by changing the timing of various operating clocks. More particularly, during the time of vertical transfer, pixel data are transferred from the FIFO memory to the digital signal processor. Preferably, all of the pixel data in FIFO memory are transferred during this vertical transfer interval.

Another advantage of the present invention is that the digital signal processor can run slower, and therefore, can consume less power.

DETAILED DESCRIPTION OF THE INVENTION

Since electronic still cameras employing electronic sensors are well known, the present description will be directed in particular to elements forming part of, or cooperating more directly with, apparatus in accordance with the present invention. Elements not specifically shown or described herein may be selected from those known in the art.

Figure 1A:
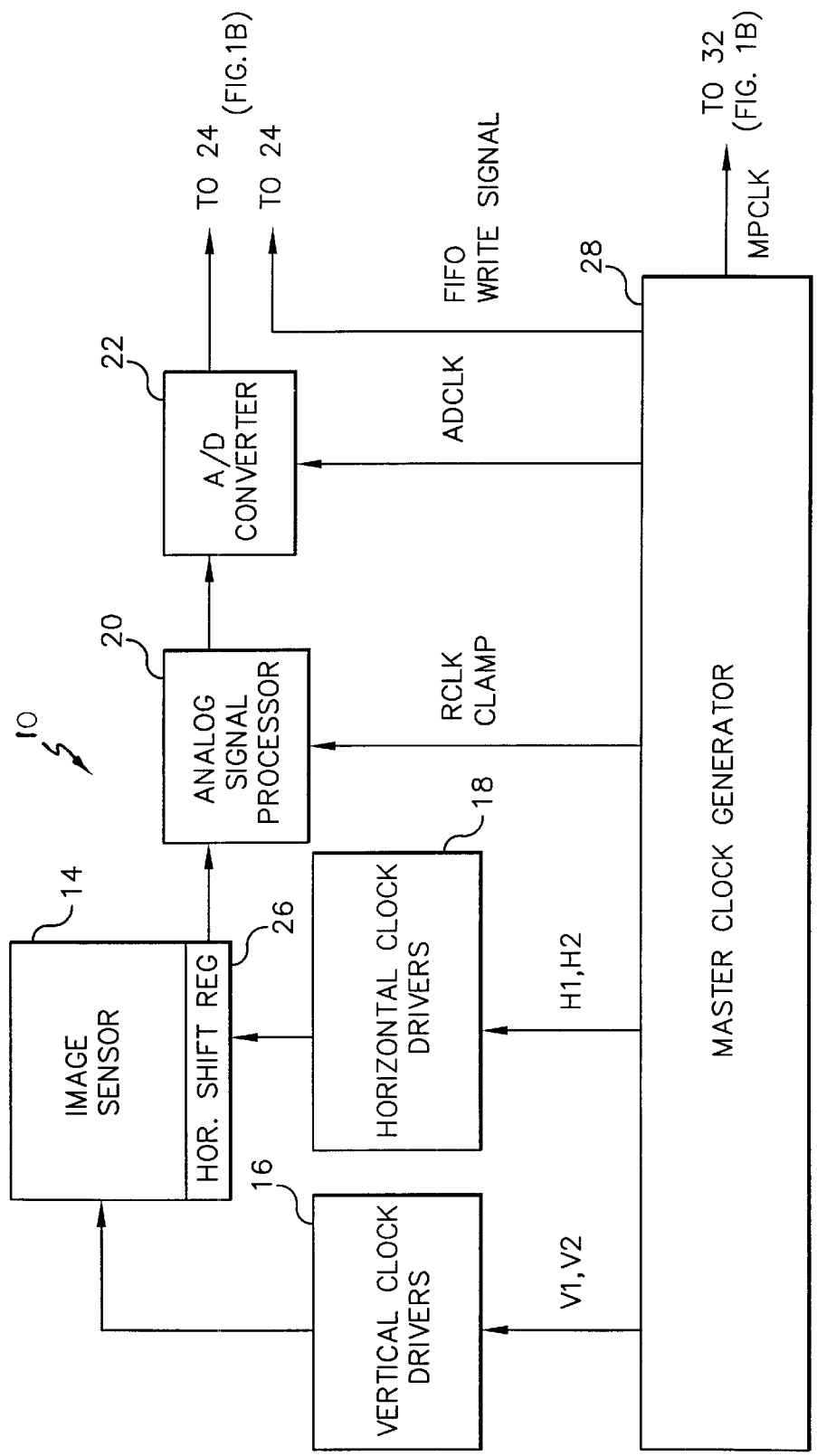
FIGS. 1A and 1B, when placed together, set forth an electronic camera having an imaging capture section, an image processing section, and a clocking arrangement in accordance with the present invention.
Figure 1B:
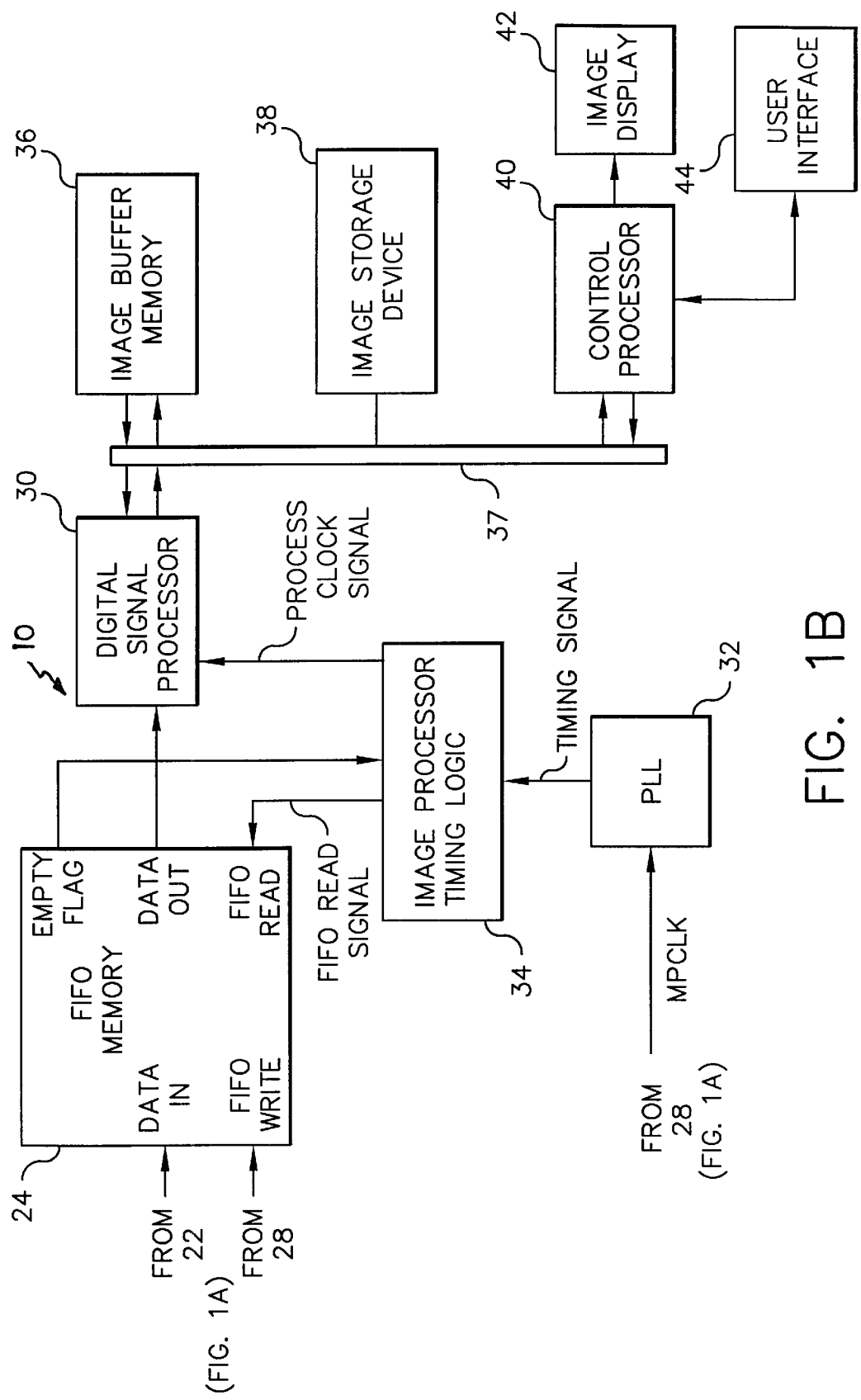

FIGS. 1A and 1B, when placed together, show a block diagram of an electronic camera 10 in accordance with the present invention. The electronic camera 10, which can be, for example, the Kodak Digital Science DCS520™ camera sold by the Eastman Kodak Company, includes an image capture section, an image processing section, and a clocking arrangement. As shown in FIG. 1A, the image capture section includes a lens (not shown) and an image sensor 14, which can be a conventional charge-coupled device (CCD) such as the Kodak KAF2000CE sensor. The image capture section also includes vertical clock drivers 16, horizontal clock drivers 18, an analog signal processor (ASP) 20, and an analog-to-digital (A/D) converter 22.

In operation, the lens directs incident light upon the image sensor 14, which has a discrete number of photosite elements or pixels arranged in columns and rows to form individual photosites corresponding to the pixels of the image. Each photosite is overlaid with a color filter array (CFA), such as the Bayer CFA described in commonly-assigned U.S. Pat. No. 3,971,065, the disclosure of which is herein incorporated by reference. The Bayer CFA has 50% green pixels in a checkerboard mosaic, with the remaining pixels alternating between red and blue rows. The photosites of the image sensor 14 convert the incident photons of light into electron charge packets corresponding to the intensity of illumination incident on the photosites. Each column of photosite elements functions as a vertical shift register for transferring the electron charge packets into a horizontal shift register 26 one row or line at a time. The horizontal shift register 26 delivers the electron charge packets in each line to the ASP 20 before the next line is shifted in. Preferably, the horizontal shift register 26 and the image sensor 14 are formed on the same integrated circuit.

The analog output of each pixel is amplified and analog processed by the ASP 20 to reduce the output amplifier noise of the image sensor 14. The analog pixel data output from the ASP 20 are digitized by the A/D converter 22, such as, for example, a 12 bit A/D converter which provides a 12 bit signal in the sequence of the Bayer CFA.

As shown in FIG. 1A, the electronic camera 10 further includes a master clock generator 28 having an oscillator driven clock (not shown). The master clock generator 28 produces a plurality of clock signals with various phases and duty cycles, and which are used to control the image sensor 14, the ASP 20, and the A/D converter 22. The clock signals produced by the master clock generator 28 are well known and include vertical image sensor clock signals (V1 and V2), horizontal image sensor clock signals (H1 and H2), an image sensor reset clock signal (Rclk), an A/D convert clock signal (ADclk), and a clamp signal. V1 and V2 are applied to the vertical clock drivers 16 and are used to shift full lines of pixels, in parallel, into the horizontal shift register 26 of the image sensor 14. H1 and H2 are complementary clock signals which are applied to the horizontal clock drivers 18 and which shift a line of pixels from the horizontal shift register 26 of the image sensor 14 and deposit the line of pixels into the floating diffusion output structure, where it is converted to a voltage. Rclk discharges the floating diffusion after each pixel has been output in order to prepare for the next pixel, and ADclk signals the A/D converter 22 to sample each pixel value after the output from the image sensor 14 has settled. The clamp signal samples the reset level of each pixel, which is the level of the floating diffusion (charge to voltage conversion) cell in the image sensor 14 prior to shifting in each pixel's charge. The cell is reset by Rclk and sampled. The pixel electrons are then shifted in and sampled again to provide a voltage. The difference between these voltages is the value of that pixel.

As shown in FIG. 1B, the electronic camera 10 further includes an image processing section. The image processing section includes a First-In First-Out (FIFO) memory 24 and a digital signal processor (DSP) 30. The A/D converter 22 is connected to the input of the FIFO memory 24, and applies the digitized pixel data to the FIFO memory 24, where the data are held for subsequent transfer on a first-in, first-out basis to the DSP 30 where further image processing is performed. The master clock generator 28 provides a FIFO write signal to the FIFO memory 24 to indicate that valid pixel data is being sent from the A/D converter 22. In accordance with the present invention, the digitized pixel data is transferred from the A/D converter 22 to storage locations in the FIFO memory 24 at a first frequency set by the FIFO write signal.

The master clock generator 28 also produces a master pixel clock signal (MPclk), which is provided to the image processing section. The MPclk signal drives a Phase-Locked Loop (PLL) reference 32 which provides the image processing clock. The PLL reference 32 produces a Timing signal which is applied to image processor timing logic 34. In response to the Timing signal, the image processor timing logic 34 produces a FIFO read signal and a Process Clock signal. The FIFO read signal controls the transfer of the digitized pixel data from the FIFO memory to the DSP 30, and the Process Clock signal controls the processing of the digitized pixel data in the DSP 30. In accordance with the present invention, the digitized pixel data is transferred from the FIFO memory 24 to the DSP 30 at a second frequency set by the FIFO read signal, whereby the second frequency is lower than the first frequency (i.e., the frequency at which the digitized pixel data is transferred from the A/D converter 22 to the FIFO memory 24, as previously described).

The DSP 30 for clarity of illustration will be understood to control access to and addressing of a conventional computer data and address bus 37. Onto this bus 37 are connected an image buffer memory 36, an image storage device 38, and a control processor 40. The DSP 30 performs functions such as defect correction, CFA interpolation, white balance, color correction, tone correction, image sharpening, and compression on the digitized pixel data provided by the FIFO 24. The processed data can be temporarily stored in the image buffer memory 36 and subsequently transferred from the DSP 30 to the image storage device 38. For example, the processed digital image can be transferred through a memory card interface (not shown) to a removable memory card (not shown) where it is stored. The removable memory card can be adapted to the PCMCIA card interface, such as described in the *PC Card Standard, Release* 2.0, published by the Personal Computer Memory Card International Association, Sunnyvale, Calif., September, 1991.

As shown in FIG. 1B, the image processing section further includes the control processor 40 which receives user inputs (not shown), such as from a shutter release (not shown), and initiates a capture sequence by signaling the vertical clock drivers 16 and the horizontal clock drivers 18 via the master clock generator 28. The control processor 40 also controls an image display 42 such as a liquid crystal display (LCD), where a user can view the captured image, and a user interface 44 to control the operation of the electronic camera 10 in a manner well known. The control processor 40 can be, for example, a Motorola 821 Power PC microprocessor.

Figure 2:
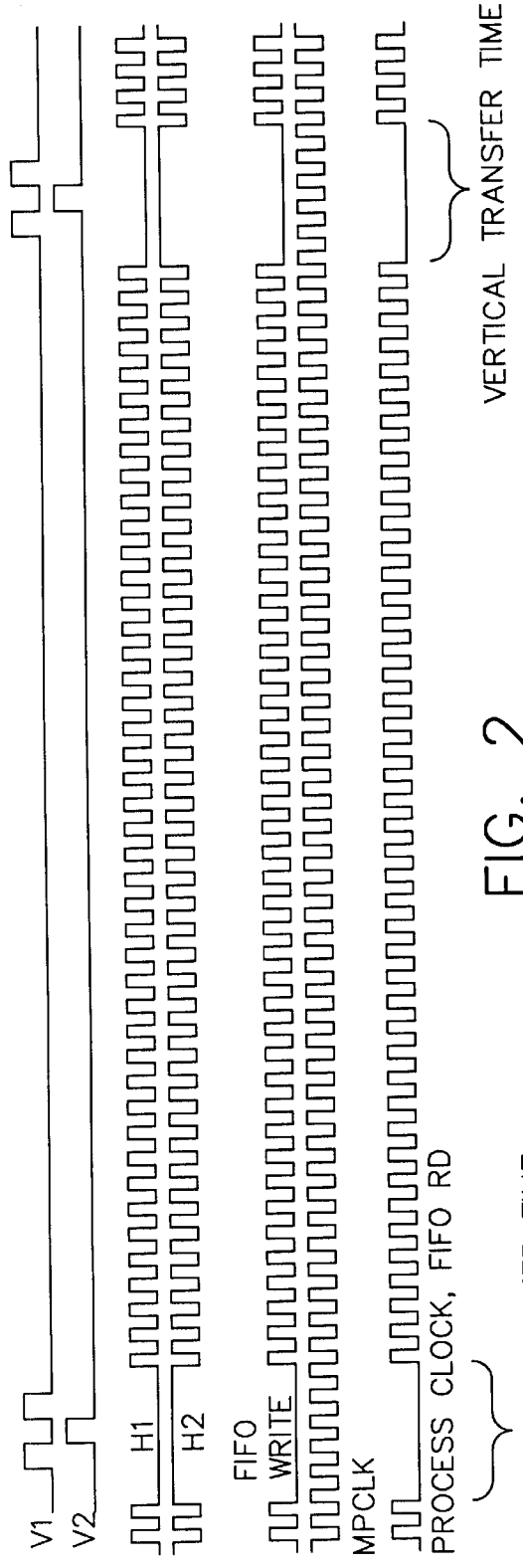
FIG. 2 is a timing diagram showing the timing of various clock signals used in the prior art.
Figure 3:
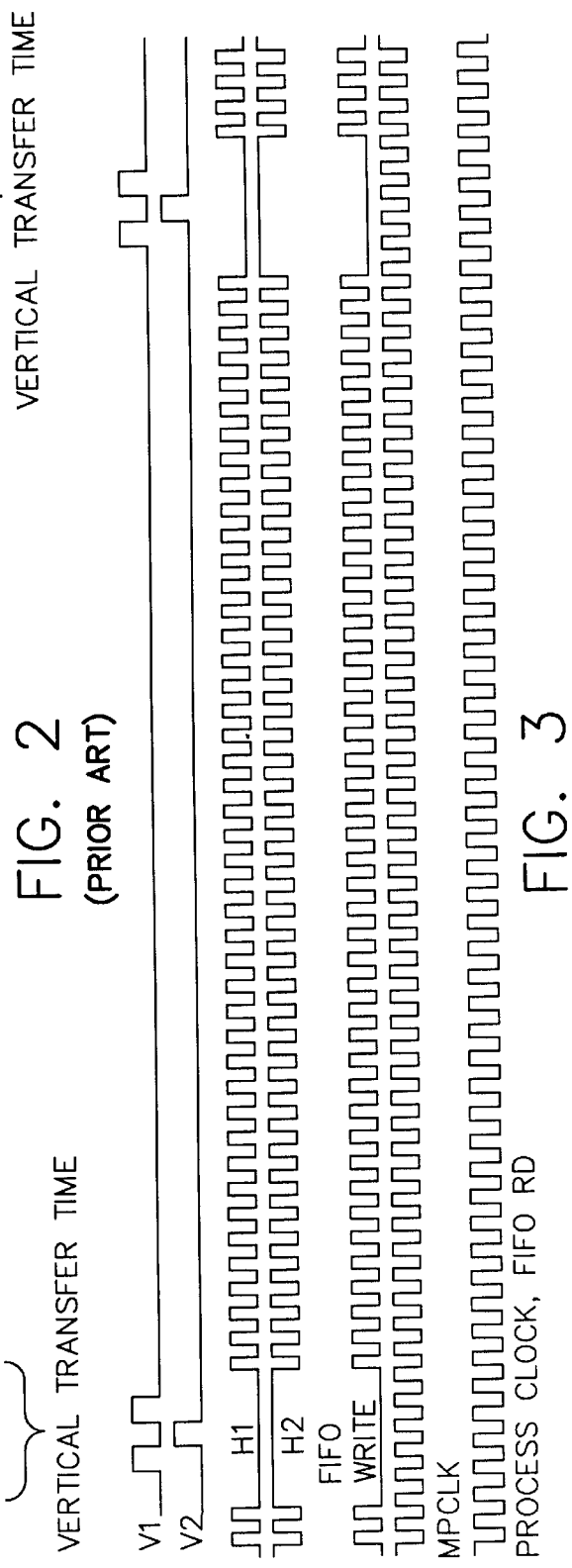
FIG. 3 is a timing diagram showing the timing of various clock signals in accordance with the present invention.

Referring now to FIGS. 2 and 3, timing diagrams of various clock signals used in prior art electronic cameras and the electronic camera 10 of the present invention, respectively, are shown. With prior art electronic cameras, the image sensor includes a relatively wide vertical transfer interval at the beginning of each line of pixel data (i.e., at the application time of V1 and V2). It is understood by those skilled in the art that the term "vertical transfer interval" is also referred to as "horizontal blanking interval." During this vertical transfer time, pixel data cannot be transferred out of the image sensor by the horizontal shift register, as charge is being transferred from the vertical shift registers to the horizontal shift register. During this vertical transfer time, as shown in FIG. 2, no pixel data is loaded into the FIFO memory. In addition, since the DSP is running in synchronism with the same frequency as the image sensor, no processing occurs in the DSP during this interval. The DSP is in an idle state, but is still consuming power.

FIG. 3 is a timing diagram showing the timing of various clock signals in the electronic camera 10 in accordance with the present invention. To allow the image processing section of the electronic camera 10 of the present invention to process pixel data during the vertical transfer time of the image sensor 14, the digitized pixel data is clocked out of the FIFO memory 24 at a lower clock frequency (i.e., the second frequency) than the frequency at which the FIFO stores a line of pixel data clocked from the image sensor 14 (i.e., the first frequency). Thus, during the time of vertical transfer, pixel data are transferred from the FIFO memory 24 to the DSP 30, and the DSP 30 can process the pixel data during the vertical transfer interval. Preferably, all of the extra digitized pixel data that filled the FIFO memory 24 during the sensor active pixel readout period is emptied from the FIFO 24 during the vertical transfer interval. By using the PLL reference 32 to produce the process clock signal which is applied to the DSP 30, the slower second frequency can be locked to the MPclk signal to ensure that the FIFO memory 24 does not fill up over the entire image processing time. In accordance with the present invention, the rate is adjusted so that the FIFO memory 24 is emptied during the vertical transfer time for each pixel line. When the horizontal clocks start again for the next pixel line, the FIFO memory 24 begins to fill since the pixel data is being written faster than it is being read. Preferably, the size of the FIFO memory 24 is selected so that this difference in rates will not fill the FIFO memory 24 over the period of one horizontal line of pixels.

It will be appreciated by those skilled in the art that by clocking the pixel data out of the FIFO memory 24 at a lower clock frequency, the effect of the vertical transfer interval is substantially reduced. By substantially eliminating the effect of the vertical transfer interval, the transfer time of pixel data from the image sensor 14 to the image storage device 38 is significantly reduced. In addition, power consumption of the DSP 30 is reduced since it runs slower and does not have an idle period.

The invention has been described in detail with particular reference to certain preferred embodiments thereof, but it will be understood that variations and modifications can be effected within the spirit and scope of the invention.

PARTS LIST 10 electronic camera
14 image sensor
16 vertical clock drivers
18 horizontal clock drivers
20 analog signal processor
22 analog-to-digital converter
24 first-in first-out (FIFO) memory
26 horizontal shift register
28 master clock generator
30 digital signal processor
32 Phase-Locked Loop (PLL) reference
34 image processor timing logic
36 image buffer memory
37 computer data and address bus
38 image storage device
40 control processor
42 image display
44 user interface

What is claimed is:

1. An electronic camera for capturing and storing images, comprising:

(a) an image capture section including:
 (i) an image sensor for capturing an image and producing pixel data representative of the captured image;
 (ii) an analog-to-digital (A/D) converter for digitizing the pixel data; and
 (iii) a horizontal shift register responsive to applied vertical clock signals for receiving lines of the pixel data from the image sensor and responsive to applied horizontal clock signals for sequentially transferring the lines of pixel data to the A/D converter, the time between the application of horizontal and vertical clock signals providing for a vertical transfer interval wherein pixel data is prevented from being output from the horizontal shift register; and (b) an image processing section including:
 (i) a first-in-first-out (FIFO) memory coupled to the A/D converter for temporarily storing the digitized pixel data;
 (ii) a digital signal processor coupled to the FIFO memory for processing the digitized pixel data; and
 (iii) storage means coupled to the digital signal processor for storing the processed digitized pixel data;

(c) clock generator means for producing the vertical and horizontal clock signals and a FIFO write signal for causing the digitized pixel data from the A/D converter to be transferred to storage locations in the FIFO memory at a first frequency, and a master pixel clock signal;

(d) means including a Phase-Locked Loop responsive to the master pixel clock signal for producing a timing signal, and image processing logic responsive to the timing signal for producing a FIFO read signal for transferring the digitized pixel data from the FIFO memory to the digital signal processor at a second frequency during the vertical transfer time for processing the digitized pixel data, and after processing, for transferring the processed pixel data to the storage means; and (e) wherein the second frequency is selected to be lower than the first frequency so as to substantially reduce the effect of the vertical transfer interval of the pixel data output from the horizontal shift register, and thereby reduce the transfer time of pixel data from the image sensor to the storage means.

2. The electronic camera according to claim 1 wherein the pixel data from the FIFO memory is transferred to the digital signal processor during the vertical transfer interval.

3. The electronic camera according to claim 2 wherein the FIFO read signal producing means further includes means for producing a process clock signal for controlling the processing of the digitized pixel data.

* * * * *

UNITED STATES PATENT AND TRADEMARK OFFICE
CERTIFICATE OF CORRECTION

PATENT NO. : 6,593,967 B1
DATED : July 15, 2003
INVENTOR(S) : James E. McGarvey et al.

It is certified that error appears in the above-identified patent and that said Letters Patent is hereby corrected as shown below:

<u>Column 6,</u>
Lines 49-51, should read:
-- The electronic camera according to claim 1 wherein the FIFO read signal producing means further includes means for producing a process clock signal for controlling the processing of the digitized pixel data --.
Lines 52-55, should read:
-- The electronic camera according to claim 1 wherein the horizontal shift register and the image sensor are formed on a first intergrated circuit --.

Signed and Sealed this

Sixteenth Day of December, 2003

JAMES E. ROGAN
*Director of the United States Patent and Trademark Office*